United States Patent [19]

Suzuki et al.

[11] 4,189,763
[45] Feb. 19, 1980

[54] DOCUMENT ILLUMINATION APPARATUS

[75] Inventors: Shigeru Suzuki; Yuji Yasuda, both of Tokyo, Japan

[73] Assignee: Ricoh Company Ltd., Tokyo, Japan

[21] Appl. No.: 871,587

[22] Filed: Jan. 23, 1978

[30] Foreign Application Priority Data

Jan. 25, 1977 [JP] Japan .................................. 52-6347

[51] Int. Cl.² .......................... F21V 1/00; F21V 11/00
[52] U.S. Cl. ........................................ 362/241; 355/8; 355/11; 355/37
[58] Field of Search .................. 355/8, 11, 37, 70, 67; 362/237, 239, 240, 241

[56] References Cited

U.S. PATENT DOCUMENTS

| 3,669,538 | 6/1972 | Fowler | 362/241 |
|---|---|---|---|
| 3,720,465 | 3/1973 | Bruce et al. | 355/8 |
| 3,732,004 | 5/1973 | Yamanoi | 355/70 |
| 3,777,135 | 12/1973 | Rees | 355/70 |
| 3,804,513 | 4/1974 | Ogawa | 355/70 |
| 3,920,326 | 11/1975 | Hirth | 355/8 |
| 3,961,849 | 6/1976 | Jones | 355/11 |

Primary Examiner—Harold Tudor
Attorney, Agent, or Firm—Frank J. Jordan

[57] ABSTRACT

First and second fixed light sources each comprising a lamp and an elliptical reflector radiate light onto first and second plane mirrors which reflect the light onto an original document. A drive means rotates the first and second reflectors in an interlocked manner such that the reflected light therefrom scanningly sweeps across the document in superimposed relation. The axes of the elliptical reflector are arranged so that the edges of the document are illuminated with greater intensity than the center thereof.

2 Claims, 6 Drawing Figures

DOCUMENT ILLUMINATION APPARATUS

BACKGROUND OF THE INVENTION

The present invention relates to an illumination apparatus for illuminating an original document in an electrostatic copying machine or the like.

Continuous efforts have been made in the art of electrostatic copying machine to increase the speed of operation. In one type of copying machine an original document is placed face down on a transparent platen and illuminated from below. An illumination apparatus generally comprising a lamp and a curved reflector is moved together with an optical system to scan the document. A light image of the document is focussed through the optical system through a slit onto a moving photoconductive member such as a drum to form an electrostatic image through localized photoconduction. The electrostatic image is developed to form a toner image which is transferred and fixed to a copy sheet to provide a hard copy of the original document.

In this type of copying machine both the optical system and exposure apparatus must be reciprocated once to make each copy. The optical system may be designed so that it is necessary to reciprocate only one or two small plane mirrors, thereby constituting no significant problem. However, the exposure apparatus is much bulkier than the mirrors, and tends to vibrate when moved at high copying speeds. This causes the mirrors and other elements of the optical system to also vibrate and degrade the image quality. In addition, the life of the lamp is reduced by the shocks caused by rapid reversal of direction of movement. It is not desirable to rotatingly reciprocate the drum due to the weight thereof, but to rotate the drum at constant speed in one direction.

In such a copying machine it is also desirable to illuminate the edges of the document with greater intensity than the center thereof. This is since an uncompensated light image will be darker at the edges than at the center in accordance with the well known $\cos^4\theta$ rule. The increased illumination at the edges cancels out the $\cos^4\theta$ effect and produces a uniform light image. Such compensation has been difficult and complicated to accomplish in prior art copying machines with the type of illumination apparatus in which the illumination lamp and reflector are moved.

Another type of copying machine comprises a photoconductive member having a flat surface such as a sheet or endless belt. The illumination apparatus and optical system are fixed. The illumination system illuminates the entire document with a high intensity flash and the optical system focuses a light image of the entire document onto the photoconductive member. Whereas this type of copying machine eliminates the problems encountered in moving illumination and optical components at high speeds for scanning, it increases the overall size and weight of the copying machine. The electrical power required to produce the high intensity flash is much greater than that required in a scanning type illumination apparatus. As yet another disadvantage in a flash exposure copying machine, the photoconductive member must be in planar form, such as a sheet or belt. Such photoconductive members are much less durable than a cylindrical photoconductive drum and require repair and replacement at frequent intervals.

SUMMARY OF THE INVENTION

The present invention overcomes the drawbacks of the prior art by providing an illumination system comprising first and second fixed light sources each including a lamp and an elliptical reflector. First and second plane mirrors reflect light from the first and second light sources onto an original document disposed on a platen. A drive means rotates the first and second mirrors in an interlocked manner such that the reflected light therefrom scanningly sweeps across the document in superimposed relation. The axes of the elliptical reflectors are arranged so that the edges of the document are illuminated with greater intensity and the center thereof.

It is an object of the present invention to provide an illumination system for an electrostatic copying machine which enables high speed copying without vibration or shock, and thereby high image quality.

It is another object of the present invention to provide an illumination apparatus of reduced size, weight and cost but improved performance.

It is another object of the present invention to provide a scanning type illumination apparatus which illuminates the edges of an original document with greater intensity than the center thereof.

It is another object of the present invention to provide a generally improved document illumination system for an electrostatic copying machine.

Other objects, together with the foregoing, are attained in the embodiments described in the following description and illustrated in the accompanying drawing.

DESCRIPTION OF THE PREFERRED EMBODIMENTS

While the illumination apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
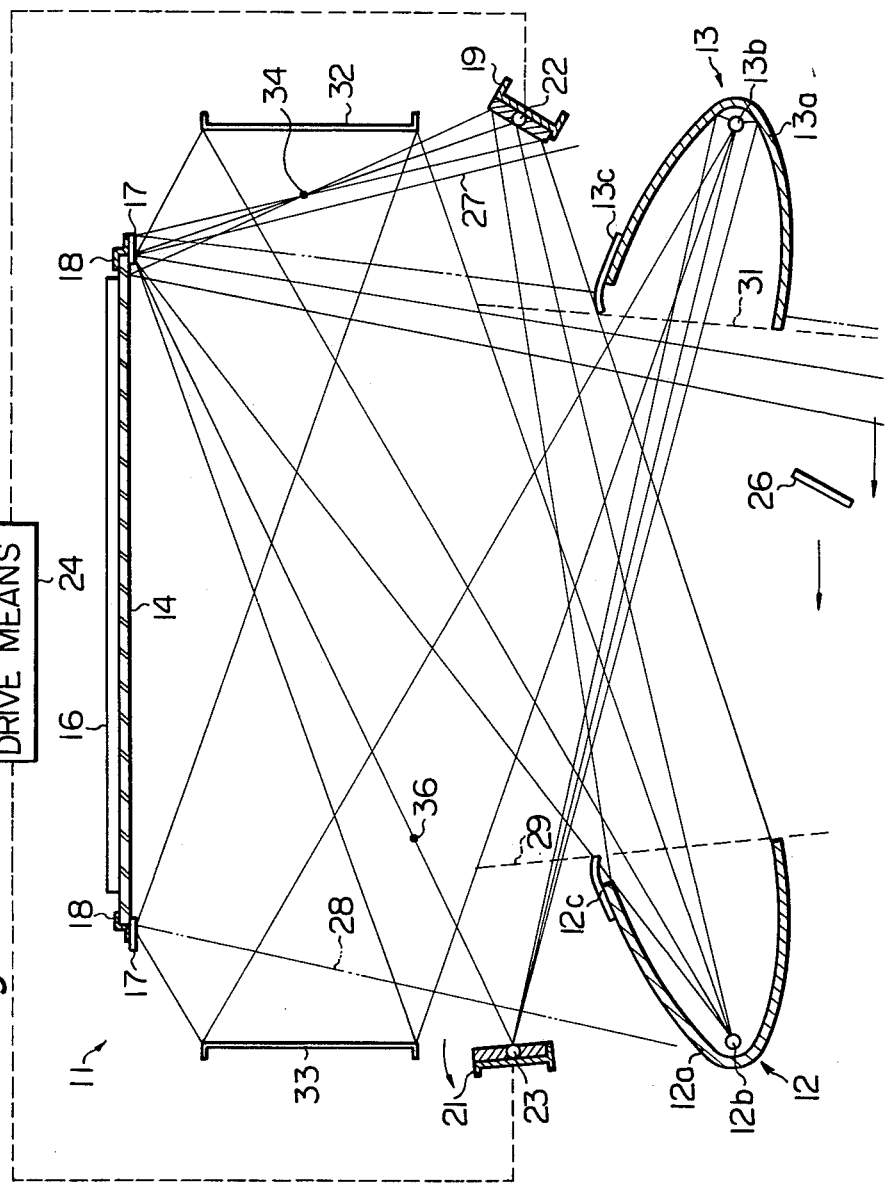
FIG. 1 is a schematic view of a first embodiment of an illumination apparatus of the present invention.

Referring to FIG. 1 of the drawing, an illumination apparatus embodying the present invention is generally designated by the reference numeral 11 and comprises first and second fixed light sources 12 and 13 respectively. Disposed above the light sources 12 and 13 is a transparent glass platen 14 for supporting an original document 16 for electrostatic reproduction. The platen 14 is horizontal and is clamped to a top surface 17 of an electrostatic copying machine or the like (not shown) by clamps 18. The document 16 is placed face down on the platen 14.

The light sources 12 and 13 comprise curved reflectors 12a and 13a having preferably elliptical cross sections. Lamps 12b and 13b are disposed in the reflectors 12a and 13a at respective foci of the elliptical cross sections. The light sources 12 and 13 are elongated in the direction perpendicular to the plane of FIG. 1 and are coextensive in this direction with the platen 14.

First and second reflectors in the form of plane mirrors 19 and 21 are mounted on shafts 22 and 23 and reflect light radiated from the light sources 12 and 13 respectively onto the document 16 through the platen 14. It will be noted that the light sources 12 and 13 and mirrors 19 and 21 are symmetrically disposed and that the light radiated from the light source 12 to the mirror 19 intersects the light radiated from the light source 13 to the mirror 21.

A drive means 24 is arranged to rotate the shafts 22 and 23 in an interlocked manner so that the light reflected from the mirrors 19 and 21 is incident on the document 16 in a superimposed relation of all positions of the mirrors 19 and 21. As shown in FIG. 1, the light reflected from the mirrors 19 and 21 is incident on the right edge portion of the document 16. Counterclockwise rotation of the shafts 22 and 23 causes the light reflected from the mirrors 19 and 21 to sweep across the lower surface of the document 16 from right to left, but with the light from the mirror 21 always superimposed on the light from the mirror 19. The drive means 24 typically comprises a drive motor, reversing switch and linkage arrangement although not shown in detail.

A mirror 26 of an exposure optical system is also driven from the drive means 24 but is removed rightwardly at a same surface speed as a photoconductive drum which is not shown. A lens (not shown) of the optical system focusses a light image reflected from the mirror 26 of the linear portion of the document 14 illuminated by the illumination apparatus 11 onto the drum through a slit to form an electrostatic image through localized photoconduction as mentioned above. The drive means 24 drives the shafts 22 and 23 in synchronism with the mirror 26. After scanning the mirrors 19, 21 and 26 are reciprocated back to their original positions, preferably at a higher speed.

The mirrors 19 and 21 are located external of limits of reflected light from the platen 14 as indicated by lines 27 and 28 respectively. The upper portions of the reflectors 12a and 13a are provided with extensions 12c and 13c providing frontal edges of the reflectors 12a and 13a aligned with the left and right edges of the platen 14 as indicated by lines 29 and 31 respectively. The extensions 12c and 13c prevent direct radiation of light from the light sources 12 and 13 onto the document 16.

Also illustrated are fixed auxiliary reflectors 32 and 33 which reflect light from the light sources 12 and 13 respectively onto the document 16. The reflectors 32 and 33 minimize unevenness of illumination by illuminating substantially the entire document 16 and supplementing the light reflected from the mirrors 19 and 21.

Figure 6:
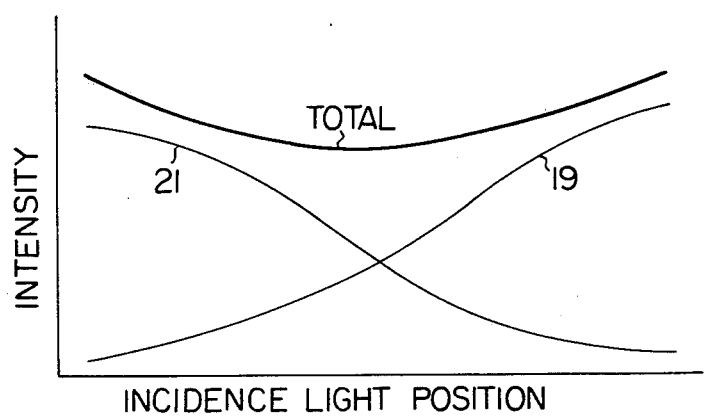
FIG. 6 is a graph illustrating the performance of the present invention.

The opposite foci of the reflectors 12a and 13a are located between the mirrors 19 and 21 respectively and the document 16. In other words, images of the lamps 12b and 13b are at positions indicated at 34 and 36 respectively. For this reason, the illumination intensity is maximum at the left and right edges of the document 16. Where the mirror 19 reflects light onto the right edge portion of the document 16, the intensity is maximized due to minimum optical path length and maximum concentration. The same applied at the left edge of the document 16 for the mirror 21. FIG. 6 shows the light intensity as a function of left to right position on the document 16. It will be seen that the total light intensity of the combination of light from the mirrors 19 and 21 is maximum at the edge and minimum in the center. This effect compensates for the $\cos^4\theta$ loss of intensity discussed in detail above and provides uniform intensity of the light image focussed on the photoconductive drum.

Figure 2:
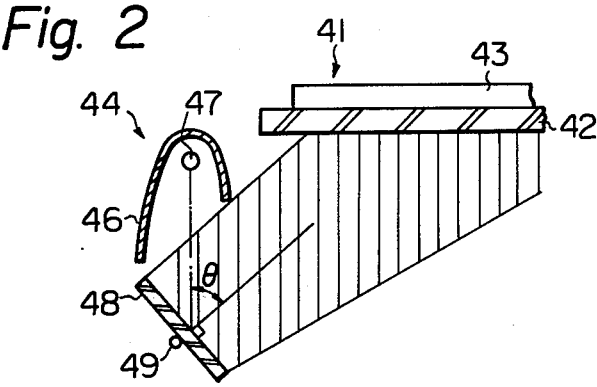
FIG. 2 is a fragmentary schematic view of a second embodiment of the present invention.

FIG. 2 shows another embodiment of the present invention which is designated as 41. An original document 43 is supported face down on a glass platen 42. In this embodiment, a light source 44 comprising an elliptical reflector 46 and a lamp 47 is disposed above a plane mirror 48 mounted on a shaft 49. A symmetrical light source and mirror are provided at the opposite edge of the platen 42, although not shown.

The reflector 46 must be disposed external of the light reflected from the mirror 48 onto the document 43 and both the reflector 46 and mirror 48 must be clear of reflected light from the platen 42 as indicated by hatching.

The apparatus 41 is advantageous in that the area below the platen 42 is clear for movement of the optical system. However, the flexibility of design of the apparatus 41 is more limited.

Figure 3:
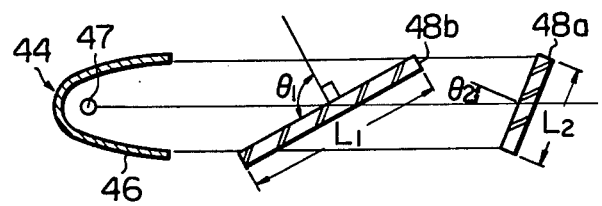
FIG. 3 is a diagram illustrating a principle of the invention.

Since the reflector 46 must be external of light reflected from the mirror 48 onto the documents 43, an angle of incidence $\theta$ of the light on the mirror 48 from the light source 44 must be increased over that in the apparatus 11. As shown in FIG. 3, when the angle of incidence is increased from $\theta_2$ to $\theta_1$, the width of the mirror must be increased from $L_2$ to $L_1$, as illustrated by mirrors 48a and 48b respectively. The embodiment of FIG. 1 is preferable in this respect and also allows the provision of auxiliary reflectors.

Figure 4:
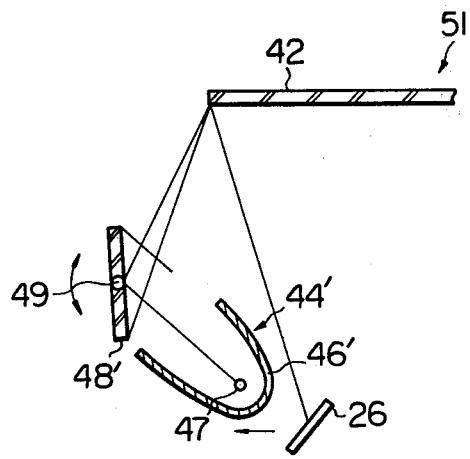
FIG. 4 is similar to FIG. 2 but shows a third embodiment of the invention.

FIG. 4 shows a similar embodiment designated as 51 in which like elements are designated by the same reference numerals and similar elements are designated by the same reference numerals primed. In this case, a light source 44' is disposed below, rather than above, a mirror 48'. In the apparatus 41 and 51, the mirrors 48 and 48' must be asymetrically rotated due to the short distance from the mirrors 48 and 48' to the light sources 44 and 44'. This is in contrast to the apparatus 11 in which the major axes of the reflectors 12a and 13a are aligned with the axes of the shafts 22 and 23 respectively.

In the embodiment of FIG. 2, the illumination efficiency can only be increased by increasing the diameter of the reflector 46, since moving the reflector 46 closer to the mirror 48 would cause the reflector 46 to block the reflected light. However, increasing the diameter means that the incident angle must be increased and the size of the mirror 48 increased as shown in FIG. 3. For this reason, the embodiment of FIG. 1 is preferred except where it is necessary to keep the space below the platen 42 as clear as possible.

Figure 5:
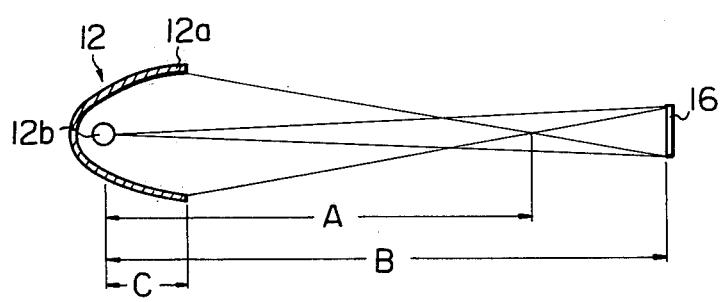
FIG. 5 is a diagram illustrating another principle of the invention.

FIG. 5 shows how the illumination efficiency may be advantageously adjusted for the desired application through variation of a distance A between the foci of the reflector 12a, distance B from the lamp 12b to the document 16 and a distance C from the lamp 12b to the edge of the reflector 12a. The illumination efficiency may be maintained substantially constant where the distance B is increased, accompanied by a corresponding increase in the distance C.

In summary, it will be seen that the present invention overcomes the problems of vibration, shock and exposure compensation which have existed theretofore in illumination apparatus for electrostatic copying machines and the like and enables higher speed copying.

Various modifications will become possible for those skilled in the art after receiving the teachings of the present disclosure without departing from the scope thereof. For example, the reflectors in the light sources may have a cross section other than elliptical, such as parabolic.

What is claimed is:

1. An illumination apparatus for illuminating a document on a transparent platen comprising, in combination:

first and second fixed light sources disposed symmetrically with respect to said platen each light source comprising a lamp and a curved reflector, each curved reflector having an elliptical cross section and the respective lamp being disposed at a focus of the elliptical cross section;

first and second rotatable reflectors for reflecting light from the first and second light sources respectively onto the document, the first and second rotatable reflectors being disposed symmetrically with respect to said platen and external of the limits of reflected light from the document, opposite foci of the curved reflectors of the first and second light sources being disposed between the first and second reflectors and the document respectively, light radiated from the first light source to the first rotatable reflectors intersecting light radiated from the second light source to the second rotatable reflector;

drive means for interlockingly rotating the first and second rotatable reflectors so that light is reflected therefrom onto the document in superimposed relation at all positions of the first and second rotatable reflectors; and first and second fixed auxiliary reflectors for reflecting light from the first and second light sources respectively onto the document being disposed symmetrically with respect to said platen.

2. An apparatus as claimed in claim 1, in which the first and second reflectors comprise first and second plane mirrors respectively.

* * * * *